United States Patent [19]

Parsons et al.

[11] Patent Number: 4,561,530
[45] Date of Patent: Dec. 31, 1985

[54] ELECTRONIC CLUTCH CONTROL SYSTEM

[75] Inventors: David Parsons, Kenilworth; Harry M. Windsor; John V. Comfort, both of Leamington Spa, all of England

[73] Assignee: Automotive Products plc, Leamington Spa, England

[21] Appl. No.: 521,600

[22] Filed: Aug. 9, 1983

[30] Foreign Application Priority Data

Aug. 11, 1982 [GB] United Kingdom ............... 8223144

[51] Int. Cl.$^4$ .................. B60K 41/28; F16D 13/75
[52] U.S. Cl. .................. 192/0.076; 192/0.052; 192/111 A
[58] Field of Search .............. 192/0.092, 0.048, 0.07, 192/0.075, 0.076, 0.032, 3.58, 103 R, 0.052, 0.04, 0.084, 111 R, 111 A; 361/238, 240, 242; 74/866, 752 D

[56] References Cited

U.S. PATENT DOCUMENTS 4,081,065  3/1978  Smyth .......................... 192/0.076
4,244,244  1/1981  Rembold et al. ................ 74/866

FOREIGN PATENT DOCUMENTS 0059035   5/1982  European Pat. Off. .
1449543   9/1976  United Kingdom .
1451371   9/1976  United Kingdom .
2079889A  6/1981  United Kingdom .
2080910A  2/1982  United Kingdom .
2088007A  6/1982  United Kingdom .

Primary Examiner—George H. Krizmanich
Attorney, Agent, or Firm—Kemon & Estabrook

[57] ABSTRACT

An electronic clutch control system for a friction clutch for starting a vehicle from rest has a clutch position control loop in which the actual clutch position feed-back signal is modified to compensate for changes in clutch characteristic. An engine speed control loop: clutch, engine, engine speed sensor, processed signals, clutch actuator control includes a switchable integrator. A wear compensation signal is added to the clutch position feed-back signal which is then subject to gain control in a gain control device in response to changes in slope of the torque-capacity/clutch position characteristic.

8 Claims, 3 Drawing Figures

ELECTRONIC CLUTCH CONTROL SYSTEM

BACKGROUND OF THE INVENTION

The invention relates to an electronic clutch control system for automatic control of initial engagement of a friction clutch between an engine and transmission of a motor vehicle during take-off of the vehicle from rest.

According to our ealier UK published patent Application No. 2 088 007 A an electronic control system for a friction clutch in an engine driven vehicle for starting the vehicle from rest comprises an engine speed sensor for deriving an engine speed signal, a reference signal generator for generating a reference signal equivalent to an engine speed signal at a reference engine speed, a clutch actuation system responsive to the engine speed signal to move the clutch towards an engaged state when the engine speed exceeds the reference speed and thereby load the engine to hold down the engine speed to the reference speed.

It has already been proposed in UK published Patent Application No. 2 079 889 A to integrate an error signal derived from the engine speed signal and reference signal and to use this integral to control the engagement of the clutch. The integrated error signal is unsuitable for bringing the clutch from a fully disengaged position to a position where it is about to bite because the sense of the integral signal continues to command full clutch disengagement until after the engine speed has reached the reference speed and has exceeded the reference speed by such an amount and for such a time as to change the sign of the integral. Thereafter, further time is taken until the clutch has moved to the bite position. During this time, substantial engine overspeed occurs and initial clutch engagement tends to be harsh. To overcome this problem, it is also proposed in the said UK patent application No. 2 079 889 A to utilise the error signal itself to control clutch engagement until the engine speed reaches the reference speed and thereafter to use the integral to control clutch engagement.

If the transition from using the basic signal to using the integral does not occur just as the clutch begins to bite, there is still a tendency for transient effects to result in harsh initial clutch operation. If the point of changing over to use of the integral is set accurately for a new clutch, subsequent wear of the clutch alters the value of the clutch position signal at the clutch bite position and again results in the transient effects causing harsh clutch engagement.

It has also been proposed in European published patent application No. 0 059 035 to derive a clutch wear compensation signal from the response of the control system to clutch take-up and to add the wear compensation signal to the clutch position signal to provide a modified clutch position signal compensated for wear.

Whilst this proposal was found to improve the smoothness of operation of the clutch, some harshness in clutch operation could still occur.

We have now discovered that it is desirable to derive and utilise a clutch condition compensation signal in such a way as to compensate for changes which occur in the torque-capacity/clutch-position characteristic of the clutch.

SUMMARY OF THE INVENTION

In accordance with one aspect of the present invention there is provided an electronic control system for a friction clutch in an engine driven vehicle for starting the vehicle from rest comprising an engine speed sensor for deriving an engine speed signal, means for deriving a clutch actuation command signal from the engine speed signal, a clutch position sensor for deriving a clutch position signal, a clutch actuation system responsive to a comparison of the command signal and the clutch position signal to move the clutch towards an engaged state when the engine speed rises and thereby load the engine to hold down the engine speed, means for deriving and storing a clutch condition compensation signal from the response of the control system to one clutch engagement and a gain control responsive to the compensation signal arranged to adjust the gain control to adjust the gain of the clutch position signal prior to its comparison with the command signal.

According to a second aspect of the invention there is provided an electronic control system for a friction clutch in an engine driven vehicle for starting the vehicle from rest comprising an engine speed sensor for deriving an engine speed signal, a reference signal generator for generating a reference signal equivalent to the engine speed signal at a reference engine speed appropriate for starting from rest, means for comparing the engine speed signal with the reference signal to derive an error signal, a switchable integrator for deriving a clutch actuation command signal from the error signal, the command signal being equivalent to the error signal at engine speeds below the reference speed and equivalent to the integral of the error signal at engine speeds above the reference speed, a clutch position sensor for deriving a clutch position signal, a clutch actuation system responsive to a comparison of the command signal and the clutch position signal to move the clutch towards an engaged state when the engine speed exceeds the reference speed and thereby load the engine to hold down the engine speed to the reference speed, means for deriving a clutch condition compensation signal from the response of the control system to one clutch engagement and a gain control responsive to the compensation signal arranged to adjust the gain control to adjust the gain of the clutch position signal and thereby provide an adjusted clutch position signal for comparison with the command signal.

Preferably the control system includes means for deriving and storing a clutch wear compensation signal from the value of clutch position signal when the clutch is just fully engaged and for adding the clutch wear compensation signal to the clutch position signal to provide a wear compensated clutch position signal, wherein the clutch condition compensation signal adjusts the gain of the wear compensated clutch position signal and thus is related directly to changes in the slope of the torque-capacity/clutch-position characteristic of the clutch.

Preferably the clutch position compensation signal is derived from a ramp signal which is added to the value of the clutch position signal when the clutch is just fully engaged and is held at a fixed level when the sum of the ramp signal and the clutch position signal reaches the level of a clutch reference signal.

Preferably the clutch condition compensation signal is derived from a ramp signal applied to the gain control during the initial clutch engagement to cause the command signal to follow the adjusted clutch position signal until the command signal reaches a level corresponding to the level of the error signal at which the switchable integrator is switched to its integrating mode.

Preferably the control system includes a torque demand sensor arranged to modify the response of the ramp signal applied to the gain control the compensate for a change in the clutch condition compensation signal which would, without such modification to the response, have been derived if the clutch condition compensation signal had been derived during starting from rest with a high torque demand.

Preferably the control system includes inhibit devices arranged to inhibit generation of the clutch condition compensation signal except when the vehicle is being accelerated from rest.

BRIEF DESCRIPTION OF THE DRAWINGS

An embodiment of the present invention will be described by way of example only with reference to the accompanying drawings in which.

DESCRIPTION OF A PREFERRED EMBODIMENT

Figure 1:
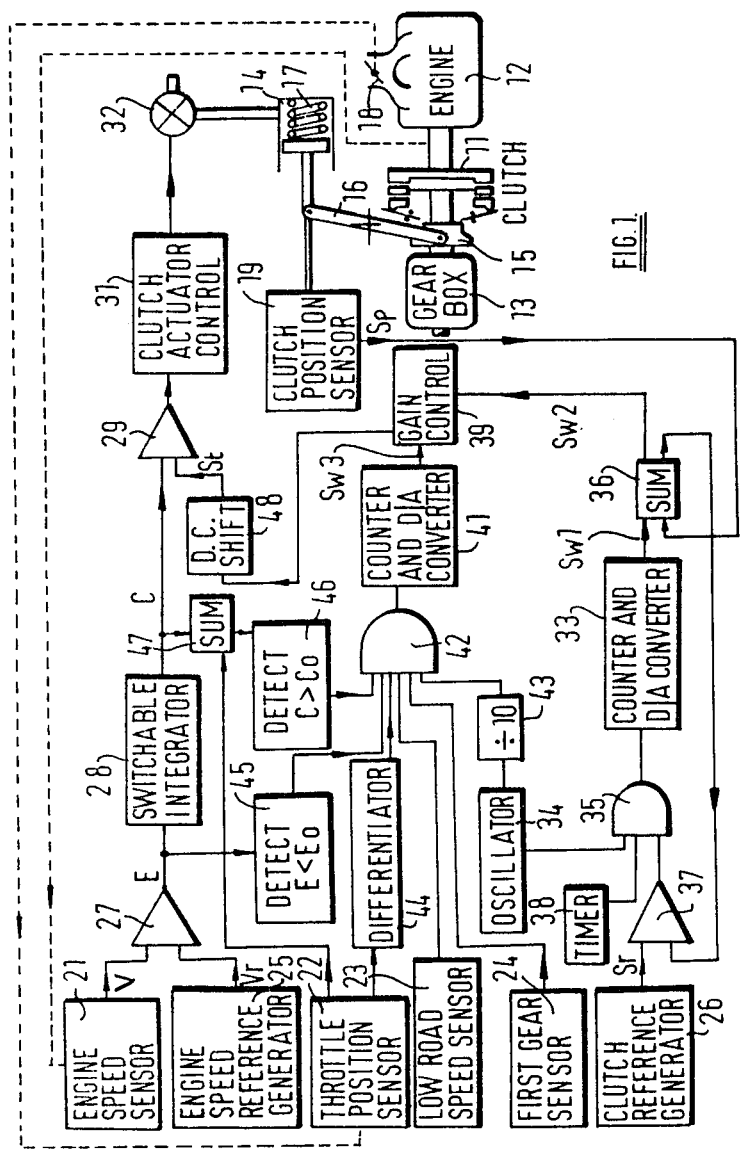
FIG. 1 is a block diagram of an electronic clutch control system according to the invention, also showing a vehicle engine, clutch and gearbox diagrammatically.

FIG. 1 shows diagrammatically a friction clutch 11 which is to be controlled by the control system of the invention. The friction clutch is interposed in a driving connection between an internal combustion engine 12 and a gearbox 13. The output from the gearbox 13 drives the road wheels of a vehicle. The clutch 11 is operated from a hydraulic cylinder 14 which is connected to a clutch-release thrust-bearing 15 by an actuating lever 16. The arrangement of the clutch actuation mechanism is such that in the absence of any hydraulic pressure, the release bearing 15 is held lightly in contact with the clutch, that is the just fully engaged position as explained below. This situation is illustrated diagrammatically by a light spring 17 within the cylinder 14.

In the following description various states of the clutch will be referred to. These are as follows.

Clutch just fully engaged

This is the position where the spring or springs engaging the clutch are not loaded by the release mechanism but the release mechanism is in contact with the clutch with all clearance taken up. The release mechanism can normally move further in the engagement direction to provide a running clearance.

Clutch fully disengaged

This represents the limit of travel of the release mechanism in a disengagement direction. There is normally a substantial clearance between the clutch friction surfaces in this position.

Clutch bite

Starting from the fully disengaged position, when the clutch is moved towards engagement, the position at which the clutch just begins to transmit torque is referred to as the bite position. From the bite position, very little further movement towards the engaged position increases the torque capacity very rapidly, and during clutch take-up under a light load, clutch slip ceases just beyond the bite point in the engagement direction.

Throughout the description and claims reference to clutch position is intended to refer to the state of engagement of the clutch as represented by the position of those parts of the clutch which are moved during engagement and release of the clutch.

FIG. 1 also shows a control system by means of which the clutch 11 is engaged in order to start the vehicle in motion from rest. The clutch is controlled in such a way that with the engine running, the vehicle stationary and first gear engaged, generation of torque demand by opening of the engine throttle 18 causes the engine speed to rise from idling speed and then causes the clutch to become engaged at such a rate as to maintain a substantially constant engine speed until the clutch has ceased to slip and established a direct drive from the engine to the gearbox.

The control system operates the clutch in response to three primary vehicle operating conditions. These conditions are:

(a) Clutch position—sensed by a clutch position sensor 19 in the form of a potentiometer connected to the clutch operating linkage.

(b) Engine speed—sensed by an engine speed sensor 21 connected to a toothed-wheel or similar pick-up coupled to the engine crankshaft.

(c) Throttle position—sensed by a throttle position sensor in the form of a potentiometer coupled to the engine throttle 18 which in turn is operated from the usual accelerator pedal. In its broadest sense the throttle position is a measure of torque demand, and in the case of a diesel engine would be replaced by the fuel control slide position.

The control system also responds to further vehicle operating conditions which are used merely to inhibit operation of the clutch take-up control except in appropriate circumstances. These are:

(d) Low road speed—sensed by a low road speed sensor 23 arranged to sense when the vehicle is travelling at a speed of less than a predetermined speed of for example 10 kph. This speed is selected as a speed by which the clutch has become fully engaged on take off from rest.

(e) Engagement of first gear—sensed by a first gear sensor associated with a gear ratio selection system (not shown and forming no part of the present invention) intended for selecting an appropriate ratio and changing gear when the vehicle is in motion.

The control system also incorporates an engine speed reference generator which is permanently set to provide a constant output signal voltage Vr equivalent to the signal level of the output voltage V from the engine speed sensor at the engine speed at which the clutch is to be engaged. There is also a clutch reference generator 26 which is preset to produce a constant output reference signal Sr corresponding nominally to the output signal Sp from the clutch position sensor when a new clutch is just fully engaged. As will be explained subsequently, the actual signal in the clutch just fully engaged position varies with wear of the clutch and it is not necessary for the clutch reference signal Sr to correspond accurately with signal Sp at the point of full clutch engagement.

The outputs V and Vr from the engine speed sensor and engine speed reference generator respectively are compared in a comparator 27 which produces an output error signal E such that $$E = Vr - V$$

Thus the error signal E is positive when the engine speed is below the reference speed and passes through zero and becomes negative as the engine speed becomes equivalent to or exceeds the reference speed. The error signal E is superimposed on a dc level of 6 volts, so that when E itself is zero signal volts, the voltage at the output from comparator 27 is 6 volts. It is this error signal E, subject to modification, which is fed into a clutch control loop to cause increased clutch engagement when the signal goes negative and to cause decreased clutch engagement when the signal goes positive. The arrangement is such that an increase in engine speed beyond the reference speed drives E negative which in turn causes an increase in the degree of engagement of the clutch, thereby increasing the load on the engine and controlling its speed to the reference speed.

Instead of using the error signal E itself to control engagement of the clutch between the stage when the clutch begins to bite and the stage when clutch slip ceases, it is preferable to use the integral of signal E. The clutch engagement signal thus gives a measure of the time for which E has been negative as well as the extent to which E is negative. This gives a fast response to small changes in E without a high gain as such which could lead to instability. However, until E reaches zero, that is until engine speed reaches reference speed, the integral of E continues to increase in a direction to cause clutch disengagement and the clutch remains fully disengaged. When E changes sign the value of the integral changes towards the sense for clutch engagement but by the time the integral has passed through zero and brought the clutch to the bite position, the engine speed has overshot very substantially. Then follows a rapid harsh initial clutch engagement which is unsatisfactory.

To overcome this problem signal E itself, superimposed in this example on a dc level of 6 volts, is used to control engagement of the clutch from the fully disengaged state to the bite position. The dc level is selected so that the bite position is reached just as signal E itself goes negative. In this way the clutch is engaged to the bite position as the engine speed increases from idling speed to the reference speed. At that stage, the control signal applied to the clutch position control loop is switched from E (with superimposed dc level) to the integral of E, integrating from the time of switchover so that the initial value of the integral of E corresponds to E itself. At switchover, the level of the integral is the same 6 volts as the dc level on which E is superimposed.

To put these requirements for the control signal into effect, a switchable integrator unit 28 is connected to the output of comparator 27. The output from unit 28 is a clutch actuation command signal C which starts by being equivalent to E with its dc level when E is positive but is switchable to the integral of E when E reaches zero. The control for switching unit 28 is signal E itself which causes switching to the integrating condition in response to E going negative.

To actuate the clutch, command signal C is fed into a clutch control loop at comparator 29. Comparator 29 is also supplied with a signal St. Signal St is a modified clutch position signal and is derived from clutch position signal Sp in a manner which will be described subsequently. For basic understanding of the clutch control loop it is assumed temporarily that signal St is the clutch position signal itself. The output from comparator 29 constitutes a different signal which is fed by way of a clutch actuator control 31 to a solenoid valve 32. The actuator control 31 generates a mark-space signal which causes the solenoid valve 32 to connect hydraulic cylinder 14 alternately with a pressure source and drain. The mark-space ratio determines whether there is a net flow into or out from the hydraulic cylinder 14 and also determines the rate of this net flow. It thus controls the velocity (including direction) at which the clutch is operated. The mark-space ratio is controlled by the difference signal from comparator 29 and is such that the clutch position is held stationary when there is zero output from comparator 29. With this arrangement, if the control signal C exceeds the signal St (assumed for the present to be equivalent to Sp) the resulting output signal from comparator 29 drives the clutch to a position where the two inputs to comparator 29 are coincident at a velocity dependent on the difference signal from comparator 29. In this way, control signal C controls the position of the clutch.

While the drive is being taken up through the clutch and the clutch is slipping, the clutch takes up a particular position which is maintained substantially constant in order to maintain the constant engine speed during clutch take-up. This position sets the level of the clutch position signal Sp during clutch take-up. In the simplified case considered thus far, this clutch position signal Sp would be fed to comparator 29 (in place of St) and thus the level at which command signal C would settle during clutch take-up would correspond to the clutch position signal. This constant value of signal C corresponds to an error signal E equal to zero because C is the integral of E. As the clutch wears or otherwise changes its characteristics during its life, the position of the clutch actuation mechanism and particularly that of the position sensor 19 as the clutch bites varies with the life of the clutch. Thus the level of signal C would also vary during the life of the clutch. This in turn causes a problem in connection with the transition of the unit 28 between its two modes because for smooth clutch operation it is necessary that the level of the command signal C should correspond with the level of the error signal E (with its superimposed dc level of 6 volts) at the stage when unit 28 is switched to its integrating mode. Otherwise, the transient operation of the system can be such as to produce a violent initial clutch engagement before the control system settles to continuing clutch engagement at steady engine speed.

To overcome this problem, a compensating circuit is provided to adjust the level and the gain of the clutch position signal Sp to derive therefrom the modified clutch position signal St.

Figure 2:
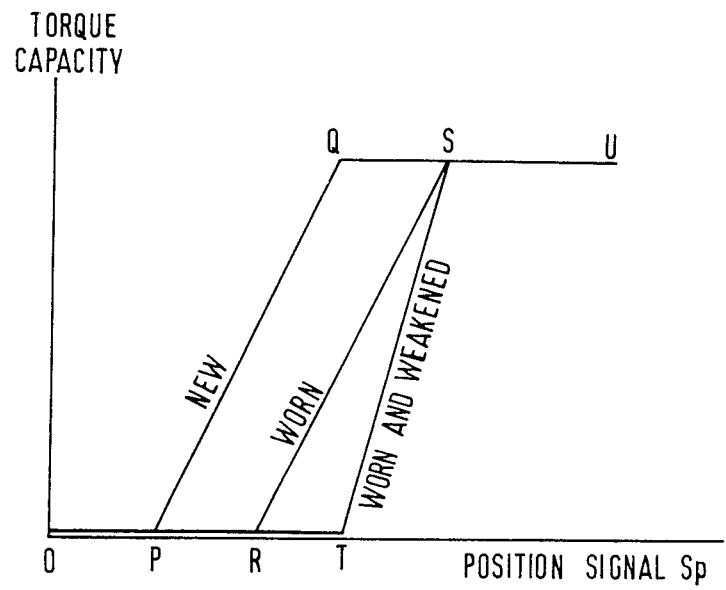
FIG. 2 is a graph showing the relationship between the torque capacity of the clutch and the position signal derived from the clutch at various stages in the life of the clutch.

The relationship between clutch position as measured by sensor 19 and transmitted torque through the clutch, namely the clutch characteristic, varies in two ways during the life of the clutch as will be explained with reference to FIG. 2. FIG. 2 shows the characteristic OPQU of a new clutch in simplified form. O represents the fully disengaged state. P is the bite position. Between O and P clearance between the friction surfaces is taken up. From P to Q the torque capacity, namely the torque transmitted during slip, increases with change in clutch position. The change is not normally linear but a linear characteristic serves for the purpose of explanation. Q is the just fully engaged position. From Q to U the clutch itself remains fully engaged and clearance develops in the actuation mechanism. As the friction surfaces wear, the characteristic is displaced to ORSU, the distance PR being equal to the wear. This gives a new bite point at R and a new just fully engaged position at S. A typical clutch also incorporates cushioning between two friction facings or other resilient features which change their characteristics with age, resulting in a change in slope in the characteristic, in this example to TS. Thus after some use the complete clutch characteristic becomes OTSU.

In order to compensate for a change in the bite position from P to R it is desirable to provide a modified clutch position signal at a differing level with respect to the position signal Sp. As will be explained below, the compensation which is effected in practice is from point Q to point S, namely at the just fully engaged state rather than the bite position itself, so it is also desirable to compensate for variations in clutch gain, that is the slope of the characteristic. FIG. 1 provides means by which both forms of compensation are achieved.

Referring again to FIG. 1, a counter and digital-/analogue convertor 33 forms the basis for storing a signal value equivalent to QS to be added to the clutch position signal Sp in order to alter its level. An oscillator 34 supplies a signal through and gate 35 at a frequency of 1 Khz. At the moment when the ignition is switched on and the control system comes into operation, the count in device 33 is set to zero and gate 35 is open. Gate 35 is arranged to remain open until a desired count has been reached and this count is then held for so long as the vehicle ignition remains on. To set this count, the analogue output from device 33 is fed to a summing junction 36 where it is added to the clutch position signal Sp. The output from the summing junction 36 initially has a value equal to Sp but this value increases with time. The output from the summing junction is fed to a comparator 37 where it is compared with a clutch reference signal Sr described previously. Sr is set to a level of about 10 volts, which in conjunction with other voltage levels ensures that the clutch can be engaged fully. When the summed output becomes equal to Sr, an output from comparator 37 closes gate 35 and thus stops the count in device 33. A timer 38, arranged to be on for a short time, for example 0.35 secs., from switching on the ignition is then switched off to ensure that gate 35 can not subsequently be opened. This ensures that during subsequent clutch actuation, when there is variation in the signal Sp, departure from equality at the inputs to comparator 37 will not disturb the count held in device 33.

The count held in device 33 is thus a measure of the difference between the clutch position signal Sp at the moment when the ignition is switched on and the clutch reference signal Sp. As spring 17 ensures that the clutch is at this stage in the just fully engaged position, the signal stored in device 33 having value Sw1 is a stored representation of this clutch position. Then, throughout continued operation of the clutch, the output signal level Sw2 from the summing junction 36 is equal to the sum of the instantaneous value of signal Sp plus the constant Sw1. Thus Sw2 represents a clutch position signal corrected for clutch wear. Signal Sw1 is opposite in sign from signal Sp, so Sw2 has a lower numerical value than Sp. The count held in device 33 is in effect a digital ramp signal which is held when it has reached the required level.

This correction for clutch wear defines the fully engaged position of the clutch and ensures that the value of the signal C at the just fully engaged state does not vary with wear of the clutch. However, it is desired to switch over the integrator/amplifier 28, not at the position of full clutch engagement but at the bite position. The relationship between the bite position and the fully engaged position depends on the slope of the torque-capacity/clutch-position characteristic of the clutch, which from the point of view of the clutch position control loop is clutch gain. This is another factor which varies with the life of the clutch as previously explained. In broad principle, a gain control 39 is incorporated in the clutch position control loop and during a first clutch engagement during take-off from rest has its gain adjusted while the clutch position control loop and the control loop involving signals V, E and C are both closed until signal St pulls the value of signal C to a reference level of about 6 volts corresponding to zero signal volts for signal E. The setting of the gain control is stored and used for subsequent starts of the vehicle from rest.

The way in which a gain control signal, constituting a clutch condition compensation signal is derived and stored in a counter and digital/analogue converter 41 will now be explained with reference to FIG. 1.

In detail, a gate 42 is supplied with a 0.1 Khz signal from the oscillator 34 by way of a divider 43. When gate 42 is opened, as will be described subsequently, the count occuring during this period of opening is stored in counter 41 as a measure of a clutch condition compensation signal Sw3. This is in effect a digitally generated ramp signal which is held at the level reached when gate 42 is closed. Opening of gate 42 is inhibited at road speeds above 10 kph by the low road speed sensor 23 and is inhibited when first gear is not engaged by first gear sensor 24. It is also desirable to inhibit operation of gate 42 except when the vehicle throttle is opening or has just been opened as is required for a normal start. For this purpose, a differentiator 44 incorporating a temporary hold for a period of the order of 1 sec. is connected to throttle position sensor 22 and enables gate 42 only during throttle opening and for a short period after throttle opening. Units 23, 24 and 44 with gate 42 thus inhibit generation of Sw3 except when the vehicle is being accelerated from rest. The main controls for gate 42 are a detect $E<Eo$ device 45 connected to receive signal E and a detect $C>Co$ device 46 connected to receive signal C. Eo and Co are reference values of E and C which will be explained below. As a refinement which will be described subsequently, a throttle position signal is added to signal C in a summing junction 47 but the basic arrangement utilising signal C only will be described first.

When the ignition is switched on prior to starting the engine and starting the vehicle from rest, signal Sw3, (that is the count in device 41) is set to zero. With the engine running, and first gear engaged, the accelerator pedal is depressed to increase engine speed from a tickover speed of say 700 rpm towards a reference engine speed Vr of say 1500 rpm. Eo is a value of E just below Vr, such that when engine speed is being controlled through the loop involving V, E and C, $E<Eo$. However, if the vehicle is only being moved very slowly and E drops to near tick-over after a short period above Vr, E rises above Eo. Thus the input to gate 42 from detect unit 45 enables the gate during a normal start of the vehicle from rest.

Co is the value of C which corresponds to a value of E equal to zero and thus is the desired value at which C should settle, in this example 6 volts. Thus, at the time when the switchable integrator 28 switches to its integrating mode and the engine speed exceeds Vr, gate 42 is opened by detect unit 46 and a count begins to build up in the counter of unit 41 and Sw3 becomes a steadily increasing ramp signal operating on gain control 39.

After a possibly harsh initial clutch engagement, clutch take-up and engine speed are controlled by the loop involving signals V, E and C. Assuming the clutch characteristic has changed to OTSU (FIG. 2) the switch to integrating mode for the initial take-up would occur at R, resulting in flare up of engine speed until the clutch has been controlled to point T. This flare causes the value of C to rise significantly above Co and to settle at this high level when the engine speed has been controlled to Vr.

Meanwhile, gain control 39 is continuously altering the level of signal St as the count in device 41 increases. Signal C follows signal St while engine speed continues to be controlled through V, E and C and during this activity E will drop marginally below Vr but not below Eo and not low enough to cause integrator 28 to switch out of its integrating mode. The gain control alters St in such a sense as to pull C towards Co. When C reaches Co the gate 42 is closed and the count stored in unit 41 is held, thus holding the level of Sw3 and the gain control 39.

During the next start of the vehicle from rest, while the vehicle ignition remains on, the counts stored in units 33 and 41 together modify the value of Sp to the correct level of St to ensure that switching to the integrating mode in unit 28 occurs at the bite point. This results in a smooth initial clutch engagement and there follows a smooth take-up with the engine held at reference speed until clutch slip ceases.

During the first and subsequent starts from rest, once clutch slip has ceased the engine speed rises with vehicle speed and causes the clutch to become fully engaged. Then subsequent increases in torque demand, for example by fully depressing the accelerator pedal do not provoke further clutch slip. If the first start from rest is effected with a large sudden torque demand, the engine speed control occurs at a higher level of clutch engagement and thus of signals Sp, St and C than normal and the result would be a longer opening period for gate 42 until the higher value of C is pulled down, thus setting Sw3 at too high a level. To overcome this problem, a throttle position signal, which remains zero for normal light throttle openings but increases in a negative sense for high throttle openings is supplied from sensor 22 and added in summing junction with signal C. Thus for large throttle openings the value detected device 46 is lower than the actual value of C and gate 42 is closed before C itself has dropped to Co. This compensates for the high level to which C had risen in this situation and thus maintains the value of Sw3 substantially as for a more gentle start.

It would be possible to arrange for all of the compensation required of Sp to establish St to be carried out by a gain control operated in the same way as gain control 39. However, the response to starting from rest at varying throttle openings, requiring slightly different bite positions, may not be so good as for the system shown. More significantly, the first take-up from rest could be very unsatisfactory as it would occur without any modification of signal Sp to allow for wear or change in gain. The wear compensation associated with the count held in unit 33 can be thought of as a coarse compensation which is carried out before the first clutch engagement and ensures that this first engagement is no worse than moderately harsh. The gain control is then a fine adjustment to ensure a smooth take-up during subsequent starts from rest.

Figure 3:
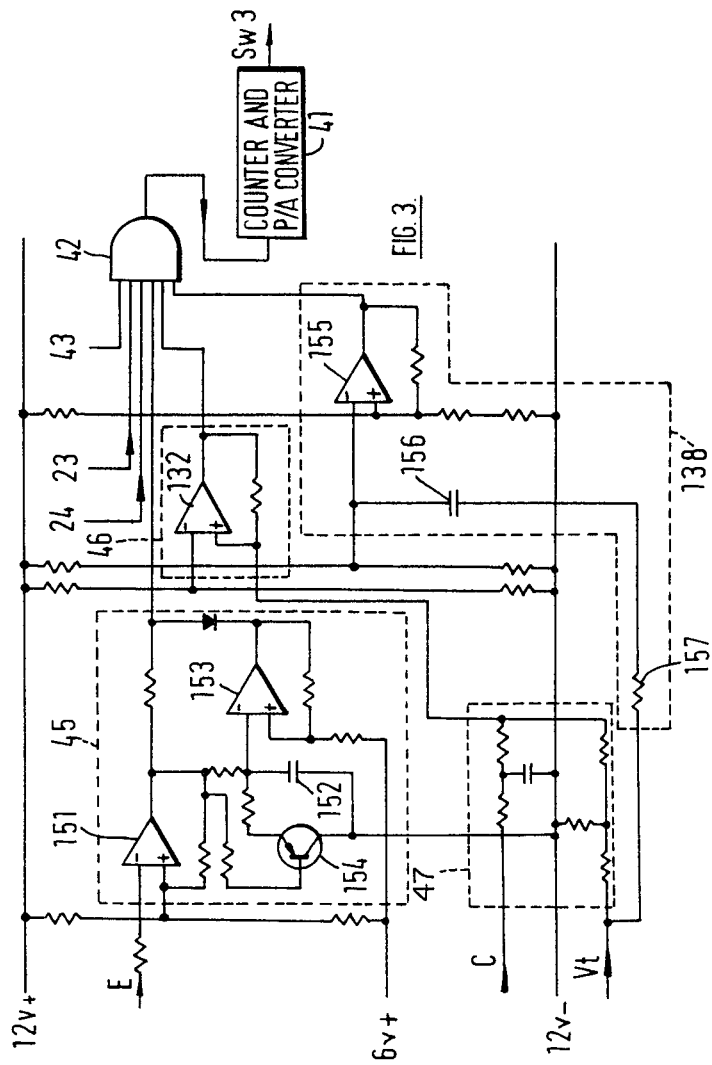
FIG. 3 is a circuit diagram showing parts of the control system of FIG. 1 in greater detail.

Now with reference to FIG. 3 detailed circuits of various of the components are shown. The detect E<Eo 45 comprises a Schmidt trigger 151 which receives the error signal E superimposed on 6 volts and compares it with a fixed reference voltage representing Eo which is just above 6 volts. When the Schmidt trigger 151 is triggered by the error signal itself approaching zero or going low (as engine speed rises) its output signal goes high and opens the AND gate 133 provided that all its other input conditions are met. When the output of trigger 151 goes high, it starts to charge up capacitor 152 causing the input to a second Schmidt trigger 153 to increase. The second trigger 153 is an inverting amplifier and its normally high output goes low when the amplifier 153 is triggered. The output from the second Schmidt trigger 153 then pulls down the high output from the first trigger 151 and closes the gate 42. The time lapse period for the capacitor 152 to charge up, and for which both trigger outputs are high is approx. 1 second. This limit to the time for which gate 42 is open is a safeguard against spurious opening of the gate at unsuitable times. If the error signal E suddenly goes high, that is above Eo, because the engine speed has dropped well below reference speed, the trigger 151 immediately switches low shutting off the gate 42. This would be the situation if the throttle is closed as soon as the vehicle has begun to start from rest.

A transistor 154 allows the capacitor 152 to discharge immediately so that when the error signal subsequently goes low again, the capacitor 152 requires the full time lapse to charge.

The detect C>Co 46 comprises a Schmidt trigger 132 connected to a reference voltage ($\simeq$6 volts) and a combined signal which is summed from the throttle potentiometer signal Vt and the clutch command signal C. The reference voltage is the voltage level Co discussed above. When the command signal C goes high the Schmidt trigger 132 is triggered and its output opens the gate 42 provided all its other input conditions are met.

The throttle differentiator 138 comprises an inverted Schmidt trigger 155 whose output is connected to the gate 42. The output of trigger 155 is normally high to keep the gate 42 open but when triggered goes low closing the gate. The positive input to the trigger 155 is connected to a reference voltage ($\simeq$6 volts) and the negative input is connected to the throttle position sensor 22 (FIG. 1) via a capacitor 156 and resistor 157. While the throttle is open the output from the throttle position sensor is low so the capacitor 156 effectively prevents triggering of the Schmidt trigger 155. If the accelerator is suddenly released the throttle position signal voltage goes up and the capacitor 156 discharges a high signal input to the trigger 155 causing it to trigger and its output to go low, thereby momentarily closing the gate 42. This has the effect of preventing the wear compensator from counting during those moments when the engine speed exceeds the reference due to inertia of the engine when the throttle is closed.

FIG. 3 also shows the summing device 47 by which the throttle position signal Vt is added to command signal C when Vt becomes significant at high throttle openings.

Although the control system has been described as being constructed of discrete hardware components, and prototypes have taken this form, it is clear that many of the operations could be carried out in a software mode in a microprocessor system. The invention extends to a system having sensors and other inputs and outputs as in the embodiment described but having the various logic functions carried out in a software mode.

We claim:

1. An electronic control system for a friction clutch in an engine driven vehicle for starting the vehicle from rest comprising an engine speed sensor operatively connected to said engine for deriving an engine speed signal, means for deriving a clutch actuation command signal from the engine speed signal, a clutch position sensor operatively connected to said clutch for deriving a clutch position signal, means for comparing the command signal with the clutch position signal and deriving therefrom a comparison signal, a clutch actuation system responsive to said comparison signal and operatively connected to said clutch to move the clutch towards an engaged state when said command signal indicates that the engine speed rises, and thereby load the engine to hold down the engine speed, means for deriving and storing a clutch condition compensation signal from values of said engine speed signal and command signal during one clutch engagement and a gain control disposed operatively between said clutch position sensor and said means for comparing the command signal with the clutch position signal to provide gain in the clutch position signal, the gain control being responsive to the compensation signal to adjust the gain of the clutch position signal prior to its comparison with the command signal.

2. An electronic control system as claimed in claim 1 for a clutch exhibiting a relationship between torque-capacity and clutch position defined by a characteristic having a slope including means for deriving and storing a clutch wear compensation signal from the value of clutch position signal when the clutch is just fully engaged and for adding the clutch wear compensation signal to the clutch position signal to provide a wear compensated clutch position signal, wherein the clutch condition compensation signal adjusts the gain of the wear compensated clutch position signal and thus is related directly to changes in the slope of the torque-capacity/clutch-position characteristic of the clutch.

3. An electronic control system for a friction clutch in an engine driven vehicle for starting the vehicle from rest comprising an engine speed sensor operatively connected to said engine for deriving an engine speed signal, a reference signal generator for generating a reference signal equivalent to the engine speed signal at a reference engine speed appropriate for starting from rest, means for comparing the engine speed signal with the reference signal to derive an error signal, a switchable integrator connected to receive said error signal and arranged to derive a clutch actuation command signal from the error signal, the switchable integrator being such that the command signal is equivalent to the error signal at engine speeds below the reference speed and equivalent to the integral of the error signal at engine speeds above the reference speed, a clutch position sensor operatively connected to said clutch for deriving a clutch position signal, means for comparing the command signal with the clutch position signal and deriving therefrom a comparison signal, a clutch actuation system responsive to said comparison signal and operatively connected to said clutch to move the clutch towards an engaged state when said command signal indicates that the engine speed exceeds the reference speed and thereby load the engine to hold down the engine speed to the reference speed, means for deriving and storing a clutch condition compensation signal from values of said engine speed signal and command signal during one clutch engagement and a gain control disposed operatively between said clutch position sensor and said means for comparing the command signal with the clutch position signal to provide gain in the clutch position signal, the gain control being responsive to the compensation signal to adjust the gain of the clutch position signal and thereby provide an adjusted clutch position signal for comparison with the command signal.

4. An electronic control system as claimed in claim 3 for a clutch exhibiting a relationship between torque-capacity and clutch position defined by a slope including means for deriving and storing a clutch wear compensation signal from the value of clutch position signal when the clutch is just fully engaged and for adding the clutch wear compensation signal to the clutch position signal to provide a wear compensated clutch position signal, wherein the clutch condition compensation signal adjusts the gain of the wear compensated clutch position signal and thus, is related directly to changes in the slope of the torque-capacity/clutch-position characteristic of the clutch.

5. An electronic control system as claimed in claim 1 further comprising means for deriving a ramp signal wherein the clutch position compensation signal is derived from the ramp signal which is added to the value of the clutch position signal when the clutch is just fully engaged and is held at a fixed level when the sum of the ramp signal and the clutch position signal reaches the level of a clutch reference signal.

6. An electronic control system as claimed in claim 3 further comprising means for deriving a ramp signal wherein the clutch condition compensation signal is derived from the ramp signal applied to the gain control during the initial clutch engagement to cause the command signal to follow the adjusted clutch position signal until the command signal reaches a level corresponding to the level of the error signal at which the switchable integrator is switched to its integrating mode.

7. An electronic control system as claimed in claim 6 including a torque demand sensor arranged to modify the response of the ramp signal applied to the gain control to compensate for a change in the clutch condition compensation signal which would, without such modification to the response, have been derived if the clutch condition compensation signal had been derived during starting from rest with a high torque demand.

8. An electronic control system as claimed in claim 3 including inhibit devices arranged to inhibit generation of the clutch condition compensation signal except when the vehicle is being accelerated from rest.

* * * * *